United States Patent
Sahm, III

(10) Patent No.: US 12,213,458 B2
(45) Date of Patent: Feb. 4, 2025

(54) FEED CONTAINER WITH INTERNAL RETENTION MEMBER

(71) Applicant: DuraPlas, LP, Dallas, TX (US)

(72) Inventor: Victor A. Sahm, III, Dallas, TX (US)

(73) Assignee: DuraPlas, LP, Dallas, TX (US)

( * ) Notice: Subject to any disclaimer, the term of this patent is extended or adjusted under 35 U.S.C. 154(b) by 0 days.

(21) Appl. No.: 18/348,738

(22) Filed: Jul. 7, 2023

(65) Prior Publication Data
US 2023/0345905 A1 Nov. 2, 2023

Related U.S. Application Data

(63) Continuation of application No. 17/162,996, filed on Jan. 29, 2021, now Pat. No. 11,730,137, which is a continuation of application No. 14/204,351, filed on Mar. 11, 2014, now Pat. No. 10,932,442.

(51) Int. Cl.
*A01K 5/01* (2006.01)
(52) U.S. Cl.
CPC ...................... *A01K 5/01* (2013.01)
(58) Field of Classification Search
CPC ...... A01K 5/01; A01K 5/0107; A01K 5/0114; A01K 5/00
See application file for complete search history.

(56) References Cited

U.S. PATENT DOCUMENTS

| | | |
|---|---|---|
| D4,837 S | 4/1871 | Bockee, Jr. |
| D28,326 S | 3/1898 | Joy |
| 880,459 A | 2/1908 | Morris |
| 1,046,694 A | 12/1912 | Weander |
| 1,809,006 A | 6/1931 | Wright et al. |
| D154,226 S | 6/1949 | Ackermann |
| 2,960,257 A | 11/1960 | Sasse |
| 3,035,623 A | 5/1962 | Goetz |
| 3,076,289 A | 2/1963 | Gallo |
| D199,594 S | 11/1964 | Rathaus |
| 3,374,936 A | 3/1968 | Colato |
| 3,595,431 A | 7/1971 | Bird |
| 3,800,469 A * | 4/1974 | Lau, Jr. .................. A01G 9/021 47/65.5 |
| 3,825,166 A * | 7/1974 | Padovani .................. B26F 1/40 229/400 |
| 3,899,107 A * | 8/1975 | Gaal ...................... B44D 3/123 D32/54 |
| 4,135,693 A | 1/1979 | Miavitz |
| 4,204,501 A | 5/1980 | Karlsson et al. |
| 4,286,546 A | 9/1981 | Moore |
| 4,363,189 A | 12/1982 | O'Donnell, III |
| 4,436,056 A | 3/1984 | MacLeod |
| 4,664,260 A | 5/1987 | Stokes |
| D296,948 S | 7/1988 | Fuller |

(Continued)

*Primary Examiner* — Ebony E Evans
(74) *Attorney, Agent, or Firm* — Foley & Lardner LLP

(57) ABSTRACT

A feed container for storing hardened livestock feed is disclosed. The feed container has a storage area defined by a bottom wall and a sidewall for retaining animal feed within the storage area when the feed is in a solid phase and the feed container is in a non-upward resting position or is on its sidewall. Also disclosed is a method for utilizing a feed container, having said storage area for retaining animal feed within the storage area when the feed is in a solid phase and the feed container is in a non-upward resting position or is on its sidewall.

20 Claims, 2 Drawing Sheets

(56) References Cited

U.S. PATENT DOCUMENTS

| | | | |
|---|---|---|---|
| 5,133,293 A | | 7/1992 | Boozer |
| 5,172,516 A | * | 12/1992 | Maillefer ............... A01G 9/027 |
| | | | 47/80 |
| D337,181 S | * | 7/1993 | Warman .......................... D34/1 |
| D340,553 S | | 10/1993 | Sahm, Jr. |
| D353,914 S | | 12/1994 | Sahm, Jr. |
| 5,513,770 A | | 5/1996 | Seeley et al. |
| D376,453 S | | 12/1996 | Park |
| 5,738,037 A | | 4/1998 | Mahan |
| 5,791,287 A | | 8/1998 | Gruber |
| 5,953,858 A | | 9/1999 | Loosen |
| 7,124,603 B2 | | 10/2006 | Bianco |
| D545,519 S | | 6/2007 | King |
| 7,543,705 B2 | * | 6/2009 | Yourist .............. B65D 21/0233 |
| | | | 220/669 |
| 8,297,229 B1 | * | 10/2012 | Sahm, III ............. A01K 5/0135 |
| | | | 119/61.54 |
| 8,544,412 B1 | | 10/2013 | Haverstock |
| D743,636 S | * | 11/2015 | Krueger ....................... D30/129 |
| 9,272,814 B2 | | 3/2016 | Carver et al. |
| 10,932,442 B1 | * | 3/2021 | Sahm, III ................. A01K 5/01 |
| 2003/0014912 A1 | | 1/2003 | Proserpio |
| 2004/0031802 A1 | | 2/2004 | Parodi |
| 2008/0022937 A1 | | 1/2008 | Shirley et al. |
| 2010/0199554 A1 | | 8/2010 | Smaal |
| 2015/0173305 A1 | | 6/2015 | Kidder |

* cited by examiner

FEED CONTAINER WITH INTERNAL RETENTION MEMBER

CROSS-REFERENCE TO RELATED PATENT APPLICATIONS

This application is a continuation of and claims priority to co-pending U.S. patent application Ser. No. 17/162,996, filed Jan. 29, 2021, which claims the benefit of U.S. Pat. No. 10,932,442 filed as U.S. patent application Ser. No. 14/204,351 on Mar. 11, 2014, each of which is incorporated herein by reference in its entirety.

BACKGROUND

When feeding livestock, large containers are oftentimes placed on the ground to enable the animals to eat therefrom. However, it is common for these containers to tip over if, for example, an animal or person accidentally kicks or steps onto the edge of the container. As a result, the feed product within the container will empty from the container when the container is tipped or toppled, ultimately resting on the ground in dirt or mud. This is especially problematic in cold weather when feed material hardens inside the container, which increases the likelihood of the hardened feed, in its entirety, sliding out of the container as a whole. During the winter months, for example, molasses based products or other hardenable feed products can harden into a solid block when temperatures are cold temperatures or extremely cold. If the container is tipped over or is on its side in such conditions, the hardened product may be subject to damage, slide out of the container potentially damaging the entire hardened block, e.g., molasses block, and/or cause the block to crack or become contaminated or covered in dirt, mud or other debris.

SUMMARY OF THE INVENTION

A container is disclosed having a bottom wall and a sidewall forming a storage area for holding livestock feed. The container includes one or a plurality of retention members molded integral with or otherwise affixed to the inner surface of the sidewall of the container.

The retention members each extend outwardly from the inner surface of the sidewall and into the storage area. Each retention member retains a hardenable feed product in the storage area when feed product is hardened, such as for example, hardened molasses. In particular, one or a plurality of retention members extend into the storage area of the container and together grip or otherwise retain the feed material to resist a sliding outward movement of the feed material from the storage area when the container is in a non-upward resting position (i.e., is tipped or turned over on its side). The feed container may be formed of plastic or may be formed of metal.

Still further is a method for manufacturing a feed container, the feed container having a storage area defined by a bottom wall and a sidewall, the feed container for retaining livestock feed within the storage area when the feed is in a solid phase and the feed container is resting on its sidewall. The method includes forming one or more spaced apart retention members, each retention member extending from an interior surface of the sidewall into the storage area and including an outer protruding boundary and optionally, an inner depression or cavity. The one or more spaced apart retention members retain the animal feed when in a solid phase in the feed container. The step of forming the one or more spaced apart retention members includes forming the one or more spaced apart retention members so that they are disposed about 0.5 inches to about 4 inches above the bottom wall of the container. In the step of forming the one or more spaced apart retention members, each retention member extends outward from the interior surface for a distance that is between about ⅛ inch and 1 inch.

DETAILED DESCRIPTION

Figure 1:
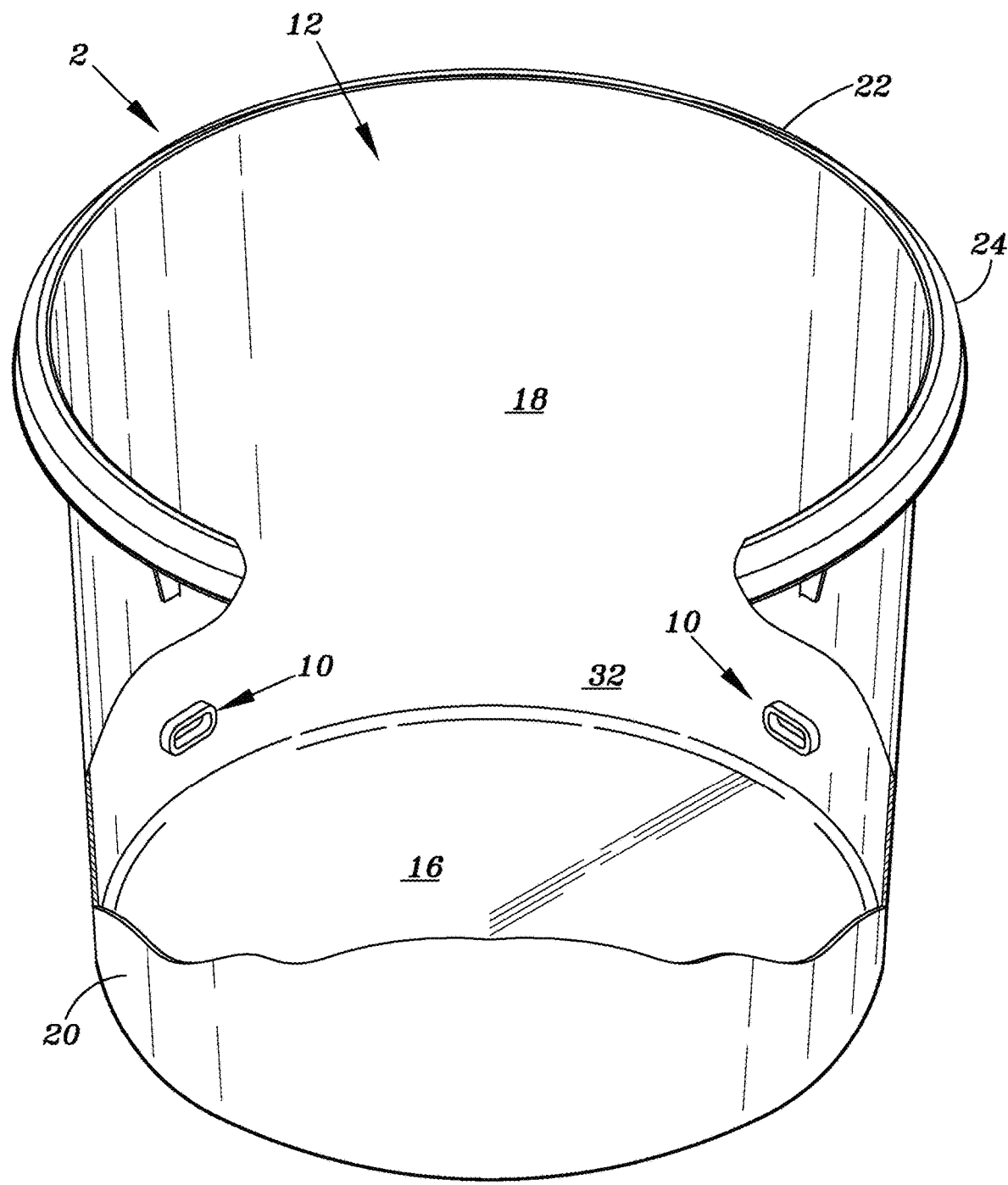
FIG. 1 is an illustration of a representative feed container in which at least one retention member is employed for one or more advantages described herein.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 2:
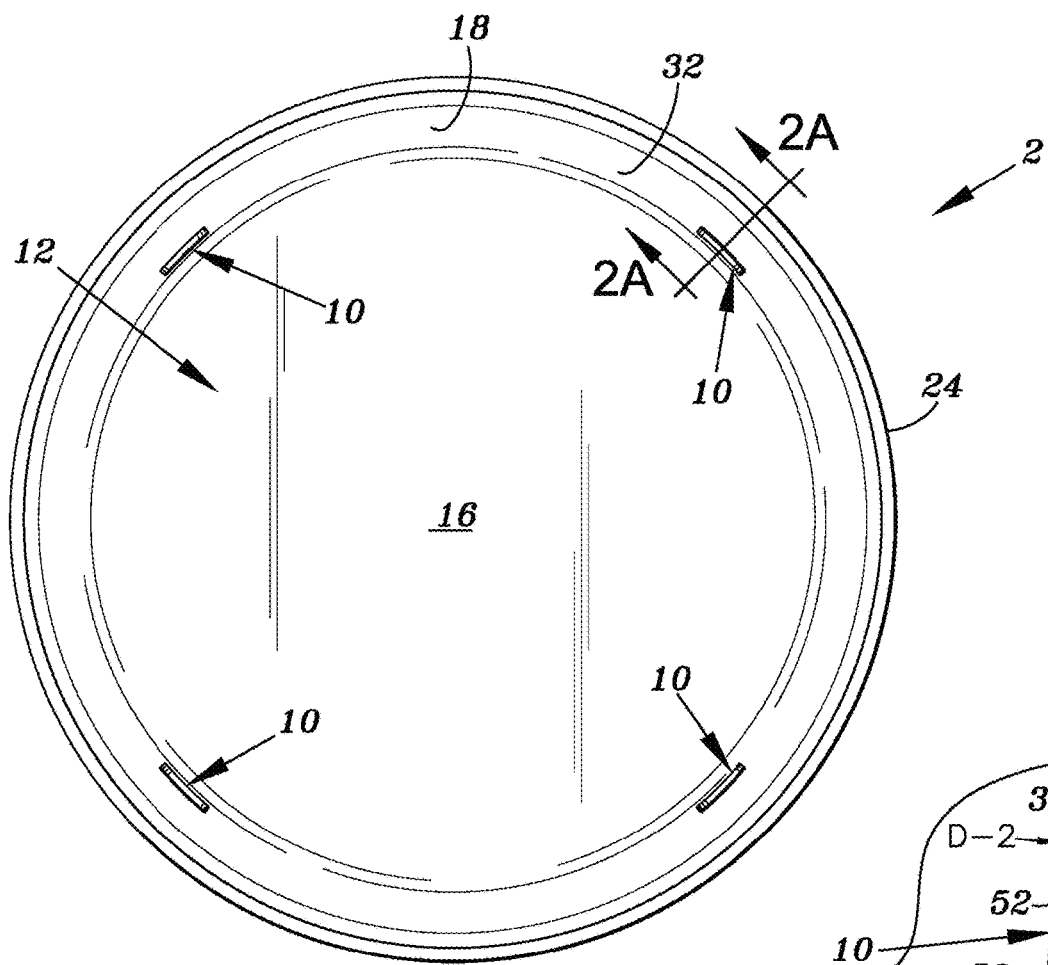
FIG. 2 is a top view of the container of FIG. 1 illustrating a plurality of retention members.

FIGS. 1-2 illustrate a feed container 2 having at least one retention member 10 that is arranged and designed to retain and/or otherwise secure a feed product within the container 2, such as a hardened feed product (whether in a hardenable state, semi-solid, or solid phase). In particular, the retention member 10 prevents and/or otherwise substantially eliminates the likelihood of hardened feed product sliding out of a storage area 12 of the container 2 and thus becoming damaged or otherwise contaminated with dirt and other debris when the feed container 2 is tipped on its side.

In the embodiment illustrated in FIGS. 1 and 2, the feed container 2 includes a bottom wall 16 and a sidewall 18 forming the storage area 12 to receive the hardenable feed product. The continuous sidewall 18 has a first or lower end 20 and a second or upper end 22. In some embodiments, as depicted in FIG. 1, the upper end 22 includes a lip 24 extending therefrom to facilitate lifting of the container 2 and to otherwise provide additional rigidity to the upper end 22.

According to some embodiments, the sidewall 18 may be perpendicularly positioned with respect to the bottom wall 16. In other embodiments, the sidewall 18 may be angularly disposed with respect to the bottom wall 16 such that a perimeter formed by the sidewall 18 at or near its lower end 20 is less than a perimeter formed by the sidewall 18 at or near its upper end 22. Generally the shape of the perimeter formed by the sidewall 18 at or near its lower end 20 and the shape of the perimeter formed by the sidewall 18 at or near its upper end 22 are generally the same, though not always of the exact same dimensions. As illustrated in FIG. 1, the shape of each of lower end perimeter and the upper end perimeter is circular, although it should be understood that the shape may vary.

As illustrated specifically in FIGS. 1 and 2, one or a plurality of retention members 10 are disposed on and extend from the inner surface 32 of sidewall 18. As illustrated, for example, in FIGS. 1 and 2, the retention members 10 are equidistantly spaced around the inner surface 32, although it should be understood that any suitable and alternative spacing configuration is acceptable. Moreover, at each location, there may also be more than one retention member 10, such that more than one retention member may be positioned side by side, or one above another, or in any other useful arrangement. In some embodiments, such as that depicted in FIGS. 1 and 2, each retention member 10 is positioned at the same elevation along the sidewall 18, although the elevation of each retention member 10 may vary.

Figure 3:
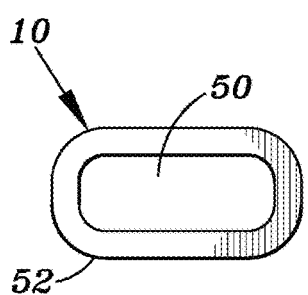
FIG. 3 is an enlarged view of the representative retention member illustrated in FIGS. 1 and 2.

In the embodiment illustrated in FIGS. 1 and 2, each retention member 10 projects outwardly from the inner surface 32 of sidewall 18. The general cross-sectional shape of the retention member 10 is non-limiting. For example, the shape of retention member 10 may be elliptical, as depicted in FIG. 3, although the shape of the retention member 10 may be circular, rectangular (FIG. 4) or polygonal (FIG. 5). It should be understood that not all retention members need be the same shape. Furthermore, in some embodiments, the retention member 10 is molded integral with sidewall 18. In other embodiments, the retention member 10 is separately affixed to inner surface 32 of sidewall 18.

Figure 4:
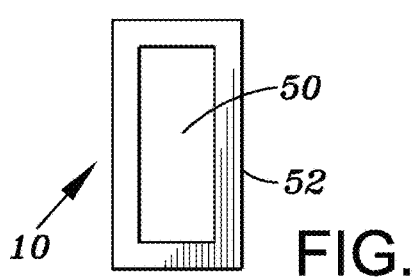
FIG. 4 is an illustration of another representative retention member described herein.
Figure 5:
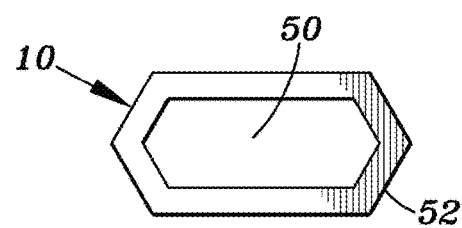
FIG. 5 is an illustration of still another representative retention member described herein.

Referring specifically to FIGS. 3-5, each retention member 10 is formed having a continuous wall 52 and includes a cavity or hollow inner region 50 to provide, as discussed in further detail below, enhanced gripping performance. It should be understood that each retention member 10 may be formed without a hollow inner region 50 and further, wall 52 may be non-continuous such that it may have spaced apart regions.

Figure 2A:
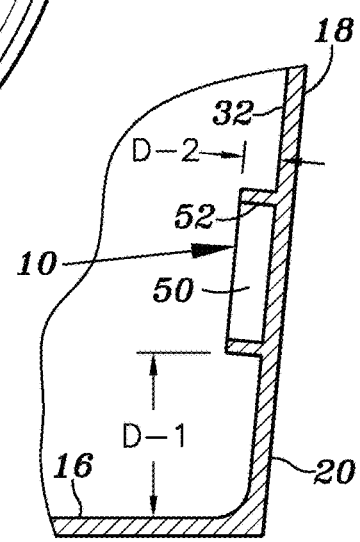
FIG. 2A is a section view detailing a retention member of FIGS. 1 and 2.

By way of example, a retention member 10 has an elliptical shape with a hollow region 50 and is spaced apart from the bottom wall 16 at a distance "D-1" (FIG. 2A) which is between about 0.5 to about 4 inches, and may be, for example, about 1 inch or about 1.5 inches or about 2 inches or about 2.5 inches or about 3.0 inches or about 3.5 inches from the bottom wall 16. As illustrated in FIGS. 1-2A, the retention member 10 extends outwardly away from inner surface 32 of sidewall 18 a distance "D-2" that is from about ⅛inch up to about 1 inch, and may, for example, extend a distance "D-2" that is ⅛inch or about ¼inch or about ½inch or about ¾ inch or about 1 inch away from inner surface 32 of sidewall 18.

Preferably, one or more retention members 10 are advantageously shaped and positioned to retain hardened livestock feed product within storage area 12 in the event the container 2 is tipped or otherwise positioned in the non-upward resting position. For example, a molasses product initially in a more liquid phase will generally harden over time when disposed within storage area 12, especially in cold weather environments. In such instances, the hardened molasses block as a solid can slide outward from the protection of storage area 12 when said container 2 is bumped, kicked, tipped or dumped over, which may lead to the hardened molasses block eventually resting on grass, dirt, mud and/or other debris. Retention member 10 is so configured that when the feed product hardens into a block, retention member 10 grips and retains the hardened feed product within storage area 12 of container 2, to prevent and/or otherwise resist sliding movement of the block from storage area 12 that could otherwise occur.

In use, a feeding product in a liquid or semi-liquid form is poured into storage area 12 of container 2 and filled, generally to a level at least at or above the one or more retention members 10. If the product solidifies, the feeding product will conform around the one or more retention members 10 and inside the hollow regions 50 for enhanced gripping. Accordingly, when container 2 is in or is moved to a position other than an upright position (e.g., tipped over or on its side), the one or more retention members 10 each grip or retain feeding product within the container 2 to prevent or substantially reduce the likelihood of feeding product sliding outwardly from storage area 12.

In one or more embodiments, container 2 is a plastic molded container and is manufactured by providing a mold cavity and a mating core, which define the shape of the feed container 2. In some embodiments, the mold cavity further comprises shaped regions defining the one or more retention members 10. In some embodiments, the mold cavity defines the container 2 and not the one or more retention members 10. In the latter embodiment, the one or more retention members 10 are separately molded and affixed to the container 2 after it is molded (e.g., adhesion, melt fitting, soldering, press fitting, nailing, bolting, etc.). During manufacture, and to form the container 2 (with or without the one or more retention members 10), a suitable plastic material for molding a feed container 2 is inserted between the mold cavity and mating core, the mold is closed and heated to a predetermined temperature after which the plastic material is formed into the container 2. After applying the necessary heat and forming the container 2, the mold cavity and mating core are separated to facilitate the removal of feed container 2 from the mating core.

Although embodiments of a plastic container 2 have been described in detail, those skilled in the art will also recognize that various substitutions and modifications may be made without departing from the scope and spirit of the appended claims to fabricate a metal or metal clad container or the like.

What is claimed is:

1. A container for storing feed, the container comprising:
   a bottom wall and a sidewall extending from the bottom wall, the bottom wall forming a floor along an entirety of a bottom of the container,
   the sidewall having a top end opposite the bottom wall, the bottom wall and the sidewall forming a storage area for receiving feed therein;
   a retention member having a continuous retention sidewall extending from an inner surface of the sidewall a first length into the storage area, the continuous retention member being spaced apart from the bottom wall of the container, the continuous retention sidewall having a first end extending from the inner surface of the sidewall of the container and a second end opposite the first end that extends into the storage area; and
   the retention member forming a hollow interior in fluid communication with the storage area through an opening at the continuous retention sidewall second end to receive and retain the feed within the storage area.

2. The container of claim 1, wherein an entirety of the retention member extends from the sidewall at a position on the sidewall of the container closer to the bottom wall of the container than the top end of the container.

3. The container of claim 1, wherein the retention member is a plurality of spaced apart retention members.

4. The container of claim 1, wherein the retention member is formed having an elliptical cross-sectional shape.

5. The container of claim 1, wherein the retention member is formed having a rectangular cross-sectional shape.

6. The container of claim 1, wherein the retention member is positioned at a distance from the bottom wall of the feed container, wherein the distance is from between about 0.5 inches to about 4 inches.

7. The container of claim 1, wherein the first end and the second end of the continuous retention sidewall are both spaced a same distance from the bottom wall.

8. The container of claim 1, wherein the continuous retention sidewall is spaced a constant distance from the bottom wall along an entirety of the first length.

9. The container of claim 1, wherein the continuous retention sidewall is spaced a same elevation from the bottom wall along an entirety of the first length.

10. The container of claim 1, wherein the hollow interior is of a constant radius and cross-section.

11. The container of claim 1, wherein the opening comprises an annulus.

12. The container of claim 1, wherein the hollow interior comprises a cylindrical hollow enclosed interior.

13. The container of claim 1, wherein the opening comprises an elliptical annulus.

14. A container for storing feed therein, the container comprising:
- a sidewall and a bottom wall forming a storage area for holding feed, the sidewall having a lower half adjacent the bottom wall, and an upper half adjacent a top end of the storage area opposite the bottom wall;
- one or more retention members extending from the sidewall and into the storage area from the lower half of the sidewall;
- each of the one or more retention members having a retention sidewall that has a first end that extends from the sidewall of the container and an opposed second end that extends inward into the storage area; and
- each retention sidewall and the sidewall of the container forming an enclosed hollow interior, the hollow interior formed to open into the storage area such that the enclosed hollow interior remains in communication with the storage area through an opening at the retention sidewall second end.

15. The container of claim 14, wherein the one or more retention members are at substantially a same elevation with respect to the bottom wall.

16. The container of claim 14, wherein the one or more retention members are equidistantly spaced apart from one another.

17. The container of claim 14, wherein the container is formed of metal.

18. The container of claim 14, wherein the one or more retention members are formed having an elliptical cross-section.

19. The container of claim 14, wherein the one or more retention members are molded integral with the sidewall, forming a discrete shape.

20. A container for storing feed therein, the container comprising:
- a sidewall and a bottom wall forming a storage area for holding feed, the sidewall having a lower half adjacent the bottom wall, and an upper half adjacent a top end of the storage area opposite the bottom wall;
- a retention member extending from the sidewall and into the storage area, the retention member having a first end that extends from the sidewall of the container and a second end opposite the first end, wherein the retention member is spaced apart from the bottom wall of the container; and
- the retention member and the sidewall of the container forming an interior area having an opening that opens into the storage area such that the interior area remains in communication with the storage area through the interior area opening, so that feed is retained by the hollow interior.

* * * * *